(12) United States Patent
Sato

(10) Patent No.: US 8,687,219 B2
(45) Date of Patent: Apr. 1, 2014

(54) SYSTEM WHICH CAN UTILIZE A FUNCTION OF AN IMAGE PROCESSING APPARATUS AS A WEB SERVICE

(75) Inventor: Tetsuya Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/323,712

(22) Filed: Dec. 12, 2011

(65) Prior Publication Data

US 2012/0154861 A1 Jun. 21, 2012

(30) Foreign Application Priority Data

Dec. 20, 2010 (JP) ................................. 2010-283777

(51) Int. Cl.
*G06F 3/12* (2006.01)
(52) U.S. Cl.
USPC ........................................................ 358/1.15

(58) Field of Classification Search
USPC ........................................................ 358/1.15
See application file for complete search history.

(56) References Cited

U.S. PATENT DOCUMENTS 6,804,018 B1 * 10/2004 Mochizuki ................... 358/1.14

FOREIGN PATENT DOCUMENTS

JP 2006-203869 A 8/2006

* cited by examiner

*Primary Examiner* — Eric A Rust
(74) *Attorney, Agent, or Firm* — Canon U.S.A., Inc., IP Division

(57) ABSTRACT

An image processing apparatus includes an execution unit configured to execute a plurality of jobs based on a processing command included in a received communication response and a determination unit configured to determine whether to transmit an execution result of an execution unit in a synchronous manner or an asynchronous manner.

20 Claims, 11 Drawing Sheets

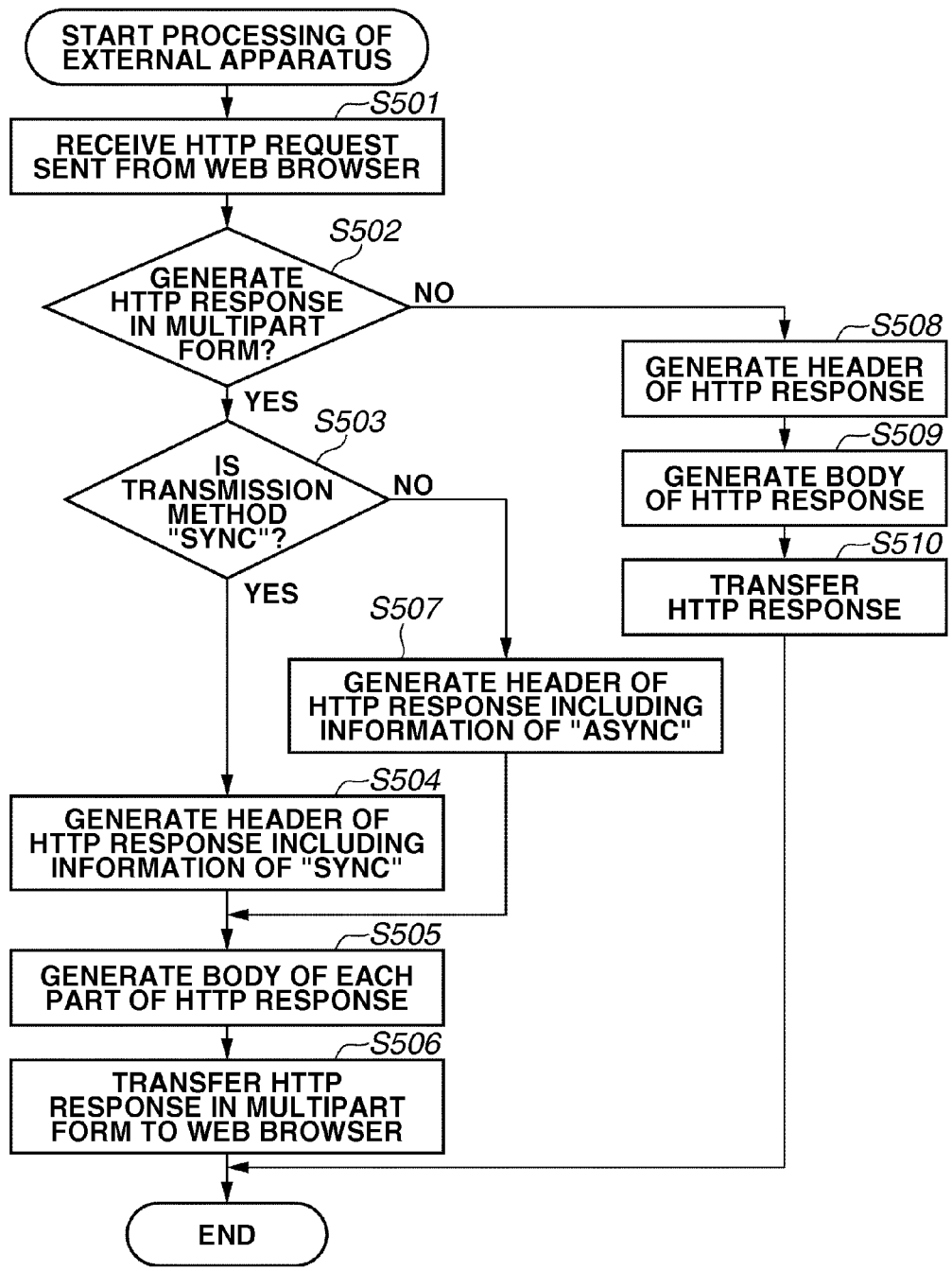

```
HTTP/1.1 200 OK
Content-Type:multipart/mixed:boundary=mfp_boundary
Content-Length: 5467

--mfp_boundary
Content-Type: application/vnd.abc.webservice
Content-Length: 2345
X-Webservice-ServiceAddress: http://xxx.0.0.1:80/Scantoftp
X-Webservice-MultiId:111222
X-Webservice-Multi-Response:sync
X-Webservice-ContentType: application/soap+xml
X-Webservice-UploadAddress: http://aaa.co.jp/bbb.ccc

... BODY OF FIRST PART

--mfp_boundary
Content-Type: application/vnd.abc.webservice
Content-Length: 3165
X-Webservice-ServiceAddress: http://xxx.0.0.1:80/Scantosmb
X-Webservice-MultiId:111222
X-Webservice-Multi-Response:sync
X-Webservice-ContentType: application/soap+xml
X-Webservice-UploadAddress: http://aaa.co.jp/bbb.ccc

... BODY OF SECOND PART
```

- 601: Content-Type line
- 602: --mfp_boundary
- 603: Content-Type/Length
- 604: X-Webservice-ServiceAddress
- 605: X-Webservice-MultiId
- 606: X-Webservice-Multi-Response
- 607: X-Webservice-ContentType
- 608: X-Webservice-UploadAddress
- 650: BODY OF FIRST PART
- 609: --mfp_boundary
- 610: Content-Type/Length
- 611: X-Webservice-ServiceAddress
- 612: X-Webservice-MultiId
- 613: X-Webservice-Multi-Response
- 614: X-Webservice-ContentType
- 615: X-Webservice-UploadAddress
- 616: BODY OF SECOND PART

```
<?xml version="1.0" encoding="UTF-8"?>
<JobScript xmlns="http://www.abc.co.jp/jobScript">
    <Box>
        <Settings>
            <DocumentId>101011</DocumentId>
        </Settings>
    </Box>
    <Send>
        <Settings>
            <FtpAddress>xxx.yyy.11.10</FtpAddress>
            <FileFormat>PDF</FileFormat>
            <FileName>test.pdf</FileName>
        </Settings>
    </Send>
</JobScript>
```

- 651: Box section
- 652: Send section

FIG.8

| MultiId 801 | ServiceAddress 802 | UploadAddress 803 | sync/async 804 | STATE 805 |
|---|---|---|---|---|
| 111111 | http://xxx.0.0.1:80/Scantoftp | http://aaa.co.jp/bbb/ccc | sync | UPLOADED |
| 111111 | http://xxx.0.0.1:80/Scantosmb | http://aaa.co.jp/bbb/ccc | sync | UPLOADED |
| 111111 | http://xxx.0.0.1:80/Print | http://aaa.co.jp/bbb/ccc | async | WAITING FOR TRANSFER OF PROCESSING RESULT FROM SERVICE PROVIDER |
| 111222 | http://xxx.0.0.1:80/Scantoftp | http://aaa.co.jp/bbb/ccc | sync | WAITING FOR TRANSFER OF PROCESSING RESULT FROM SERVICE PROVIDER |
| 111222 | http://xxx.0.0.1:80/Scantosmb | http://aaa.co.jp/bbb/ccc | sync | WAITING FOR TRANSFER OF PROCESSING RESULT FROM SERVICE PROVIDER |

SYSTEM WHICH CAN UTILIZE A FUNCTION OF AN IMAGE PROCESSING APPARATUS AS A WEB SERVICE

BACKGROUND OF THE INVENTION

1. Field of the Invention

The present invention relates to a system which can utilize a function of an image processing apparatus as a web service, an image processing apparatus, and a control method of the system.

2. Description of the Related Art

Conventionally, there is an apparatus called a multifunction peripheral (MFP) which incorporates the functionality of multiple apparatuses including a scanner, a printer, a fax machine, and a network transmission apparatus into one housing. Further, it is known that the functions of the MFP can be utilized as a web service to use the MFP by a command output from an external apparatus.

Japanese Patent Application Laid-Open No. 2006-203869 discusses a system including a MFP which generates a job (print job, image data transmission job, etc.), and executes the job when it receives a request for the web service from an external apparatus. The request is generated based on Simple Object Access Protocol (SOAP).

Regarding the system discussed in Japanese Patent Application Laid-Open No. 2006-203869, a plurality of jobs are generated by the MFP depending on the request for the web service transmitted from the external apparatus. For example, if the MFP receives a request such as "print image data as well as transmit the image data to a file transfer protocol (FTP) server", the MFP generates two jobs of a print job (print the image data) and a transmission job (transmit the image data).

If the MFP receives a request for a web service via SOAP from an external apparatus, the MFP needs to transmit (upload) a response to the external apparatus. The response is, for example, an execution result of the job. However, as described above, if a plurality of jobs is generated based on the request for web service, the processing time of the jobs will be different depending on the content, type, and setting of the job. Thus, the execution results of the jobs cannot be transmitted (uploaded) to the external apparatus at the same time.

For example, if a print job and a transmission job are requested, normally, the print job takes longer time than the transmission job. Accordingly, the timing the execution result of the print job can be transmitted will be later than that of the transmission job.

If the execution result of each of the plurality of jobs generated according to the request for the web service is individually uploaded from the MFP to the external apparatus at the timing each job is finished, the number of times the MFP communicates with the external apparatus will be increased. Accordingly, the volume of the communication traffic is increased.

However, if the results of the jobs that take different execution time are transmitted at the same time, the execution result of the job which can be finished in a short time cannot be swiftly uploaded to the external apparatus even if it is finished.

When a plurality of jobs taking different processing time are executed by the image processing apparatus, if each of the execution results of the jobs is individually transmitted to the external apparatus across the board, or if the execution results of the jobs are transmitted at one time to the external apparatus across the board, depending on the job type or the job setting, the number of communication times will be increased or the execution results of the jobs cannot be promptly transmitted.

SUMMARY OF THE INVENTION

The present invention is directed to a unit useful in determining a method for transmitting execution results of a plurality of jobs to an external apparatus when the jobs are generated and executed according to a request for a web service given by the external apparatus.

According to an aspect of the present invention, an image processing apparatus included in a system having an external apparatus and an image processing apparatus includes an accepting unit configured to accept a setting set by an user via an operation unit, a communication request transmission unit configured to transmit to the external apparatus a communication request including the setting accepted by the accepting unit, a communication response receiving unit configured to receive from the external apparatus a communication response including a processing command for using a function of the image processing apparatus, according to the communication request transmitted from the communication request transmission unit, an execution unit configured to execute a plurality of jobs generated according to the processing command included in the communication response received by the communication response receiving unit, a determination unit configured to determine whether to transmit a plurality of execution results related to each of the plurality of jobs executed by the execution unit, in a synchronous manner or in an asynchronous manner, and a control unit configured to transmit one communication request including the plurality of execution results by the communication request transmission unit if the determination unit determines that the plurality of execution results is to be transmitted in the synchronous manner, and configured to transmit a plurality of communication requests which include each execution result of the plurality of jobs executed by the execution unit, in an asynchronous manner to the communication request transmission unit if the determination unit determines that the plurality of execution results is to be transmitted in the asynchronous manner. The external apparatus includes a communication request receiving unit configured to receive the communication request including the setting set by the user, from the image processing apparatus, a generation unit configured to generate the processing command for using the function of the image processing apparatus based on the setting included in the communication request received by the communication request receiving unit, and a communication response transmission unit configured to transmit a communication response including the processing command generated by the generation unit, to the image processing apparatus.

According to another aspect of the present invention, when the plurality of jobs which have been generated based on the request for web service made by the external apparatus is executed, the execution results of the jobs can be transmitted to the external apparatus by an appropriate transmission method.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a flowchart of processing executed by the external apparatus illustrated in FIG. 1.

FIGS. 6A and 6B illustrate examples of a Hypertext Transfer Protocol (HTTP) response sent from the external apparatus and received by the MFP.

FIG. 8 illustrates an example of information managed by a result management unit of the MFP illustrated in FIG. 1.

DESCRIPTION OF THE EMBODIMENTS

Various exemplary embodiments, features, and aspects of the invention will be described in detail below with reference to the drawings.

The present embodiment describes a case where a MFP being an example of an image processing apparatus of the present invention executes a plurality of processing operations according to an instruction given by a user and transmits the result of the execution to an external apparatus.

Figure 1:
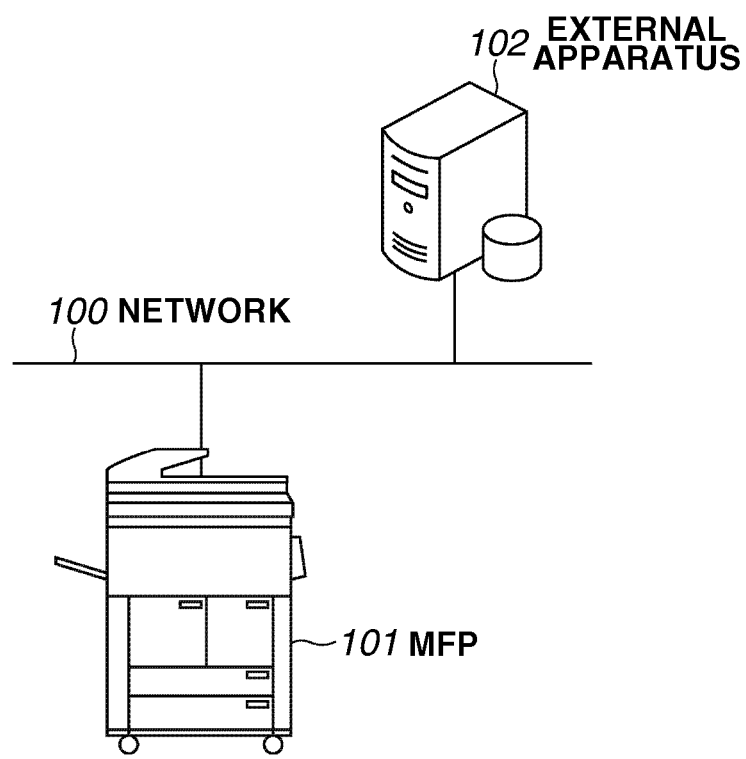
FIG. 1 illustrates an information processing system including an MFP and an external apparatus according to an exemplary embodiment of the present invention.

FIG. 1 is a block diagram illustrating an overall configuration of a system to which the present invention can be applied. The system includes an MFP 101 and an external apparatus 102 which communicate with each other via a network 100. The network 100 serves as a basis of the communication between the apparatuses. The network 100 can be an intranet, the Internet, or a network of a different network system.

The MFP 101 includes a web browser function. According to the present embodiment, the MFP 101 is managed according to a local IP address. A gateway (not illustrated) that performs address translation is located between the network 100 and the MFP 101. The gateway includes, for example, a router. Further, the gateway can include a firewall function of the MFP 101. The external apparatus 102 can distribute web content via the network. When the external apparatus 102 receives a request for web content from the MFP 101, it distributes the corresponding web content to the MFP 101.

Figure 2:
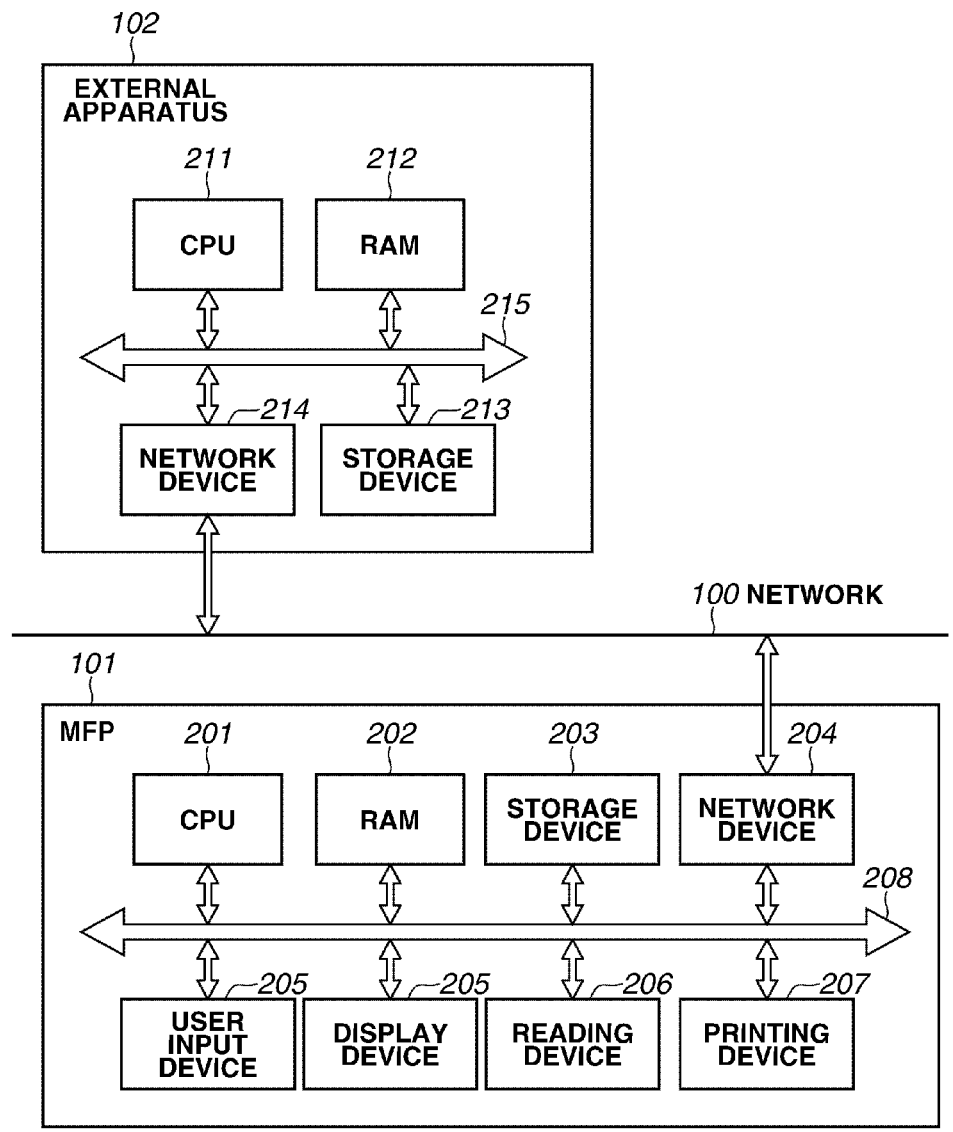
FIG. 2 is a block diagram illustrating a hardware configuration of the information processing system illustrated in FIG. 1.

FIG. 2 illustrates an example of a hardware configuration of the information processing system illustrated in FIG. 1. The hardware configuration of the MFP 101 will be described first. The MFP 101 includes a central processing unit (CPU) 201 and a random access memory (RAM) 202. The CPU 201 controls the overall operation of the apparatus. The RAM 202 provides a work area of the CPU 201. Further, the MFP 101 includes a reading device 206 that reads a document image and a printing device 207 that prints image data. Further, the MFP 101 includes a storage device 203 such as a hard disk drive (HDD) or a non-volatile RAM (NVRAM). Data, various setting parameters, and control programs are stored in the storage device 203.

Further, the MFP 101 includes a user input device 205 (e.g., a keyboard or a mouse) which accepts an operation of the user and a display device 205 (e.g., liquid crystal display) which displays an operation screen of the MFP 101. Furthermore, the MFP 101 includes a network device 204 which performs network communication between the external apparatus 102 and other apparatuses as well as a bus 208. Although the MFP 101 in FIG. 2 illustrates the user input device 205 and the display device 205 as different devices, an operation unit that functions as both devices can be used.

Next, the hardware configuration of the external apparatus 102 will be described. The external apparatus 102 includes a CPU 211, a RAM 212, a storage unit 213, a network apparatus 214, and a bus 215. The CPU 211 controls the external apparatus 102. The RAM 212 provides a work area for the CPU 211. The storage unit 213 stores data, various setting parameters, and control programs. The network apparatus 214 communicates with the MFP 101 and other apparatuses via the network.

Figure 3:
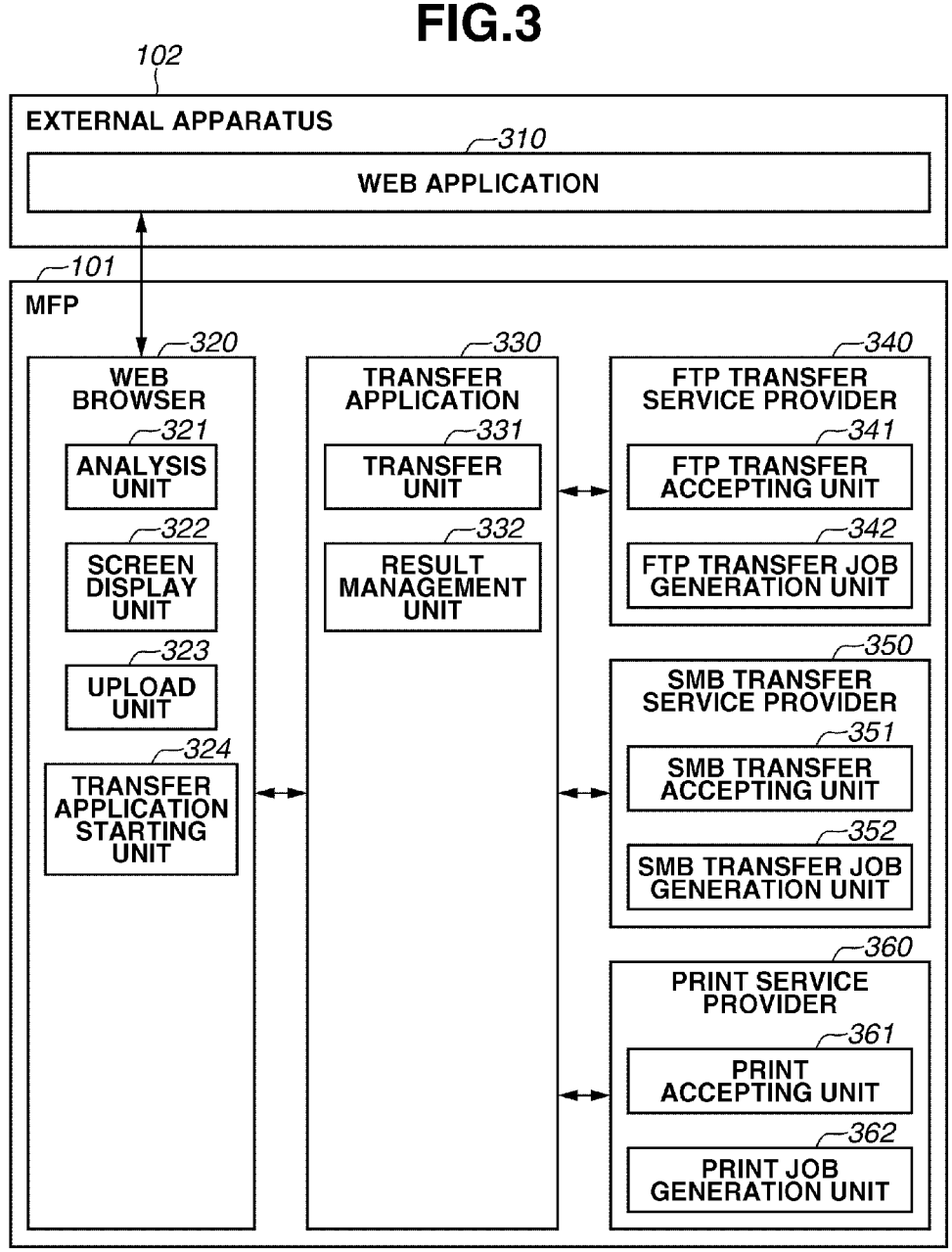
FIG. 3 is a block diagram illustrating a software configuration of the information processing system illustrated in FIG. 1.

FIG. 3 illustrates a software configuration of the information processing system according to FIG. 1. A web application 310 that runs on the external apparatus 102 is stored in the storage unit 213 and executed by the CPU 211.

The web application 310 executes processing according to a HTTP message sent from the MFP 101. For example, the web application 310 generates content in Hypertext Markup Language (HTML), which is displayed on the operation screen generated by the web browser 320. The web application 310 also generates a request for Simple Object Access Protocol (SOAP) processing which is transmitted to the MFP 101 (a FTP transfer service provider 340, a server message block (SMB) transmission service provider 350, and a print service provider 360, described below) according to the user's operation accepted via the operation screen.

On the other hand, the MFP 101 includes a web browser 320, a transfer application 330, and the service providers 340 to 360. Functions of these units are realized by the CPU 201 of the MFP 101 executing a program stored in the storage device 203.

The web browser 320 communicates with the web application 310 which runs on the external apparatus 102. Further, the web browser 320 displays the web content provided by the external apparatus 102 on the display device 205.

An analysis unit 321 of the web browser 320 analyzes a message sent from the web application 310. A screen display unit 322 displays an operation screen, which is based on the HTML content included in the received message, on the display device 205. The HTML content is an example of screen information provided by the external apparatus 102.

A transfer application starting unit 324 starts the transfer application 330 based on a result of the analysis performed by the analysis unit 321. The transfer application 330 transfers a processing command, received by the web browser 320, to the service providers 340 to 360. Further, the transfer application 330 transfers the result of the processing performed by the service providers 340 to 360 to the web browser 320.

The transfer application operates as a helper application and operates independent of the web browser. The helper application enables processing of a file in a format which cannot be processed in general by the web browser. The file which cannot be processed by the web browser is, for example, voice, moving image, and animation. However, if the transfer application includes a function that enables transfer of processing commands such as plug-in, one function of the web browser, and Java (registered trademark) Script included in the received response, then the transfer application does not need to operate as the helper application.

On receiving a request from the transfer application starting unit 324 of the web browser 320, a transfer unit 331 transfers a processing command to the service providers 340 to 360. Further, the transfer unit 331 transfers a result of the execution of the job sent from the service providers 340 to 360 to the web browser 320.

A result management unit 332 manages the result of the request sent to each service provider.

Each of the FTP transfer service provider 340, the server message block (SMB) transmission service provider 350, and the print service provider 360 generates a job according to a request for a web service sent from the transfer application 330 or the external apparatus 102. The job is executed by various hardware resources (the reading device 206, the printing device 207, the storage device 203, or the network device 204).

The FTP transfer service provider 340 includes a FTP transfer accepting unit 341 and a FTP transfer job generation unit 342. The FTP transfer accepting unit 341 accepts a processing command transferred from the transfer application 330. The FTP transfer job generation unit 342 generates a FTP transfer job for executing the requested processing based on the processing command accepted by the FTP transfer accepting unit 341.

The SMB transfer service provider 350 includes a SMB transfer accepting unit 351 and a SMB transfer job generation unit 352. The SMB transfer accepting unit 351 accepts a processing command transferred from the transfer application 330. The SMB transfer job generation unit 352 receives the processing command accepted by the SMB transfer accepting unit 351 and generates a SMB transfer job for the execution of the requested processing.

The print service provider 360 includes a print accepting unit 361 and a print job generation unit 362. The print accepting unit 361 accepts a processing command transferred from the transfer application 330. The print job generation unit 362 receives the processing command accepted by the print accepting unit 361 and generates a print job for the execution of the requested processing.

As described above, the MFP 101 includes a plurality of service providers.

Figure 4:
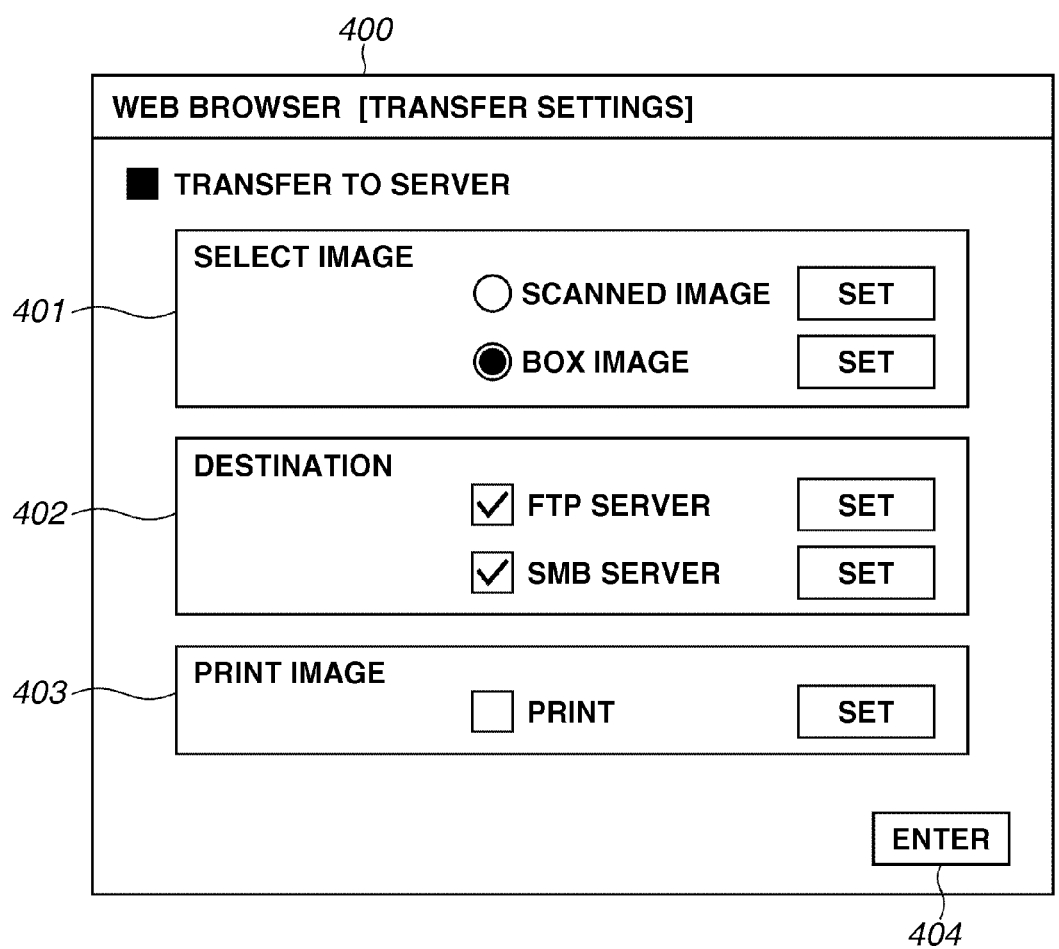
FIG. 4 illustrates an example of an operation screen displayed on a display device included in the MFP illustrated in FIG. 1.

FIG. 4 is an operation screen displayed on the display device 205. According to the present embodiment, after the web browser 320 of the MFP 101 is started, if the web browser 320 acquires HTML content from the external apparatus 102, an operation screen 400 is displayed on the display device 205. In FIG. 4, regions 401 to 403 and an enter button 404 are displayed on the operation screen 400.

From the region 401, the user selects the source of the image data to be transmitted to the designated server. The source is either the reading device 206 or the storage device 203. If the user selects a radio button "scanned image", the MFP 101 transmits the image data obtained by the reading device 206 to the server. Such an image is hereinafter referred to as the scanned image. If the user selects a radio button "box image", the MFP 101 transmits the image data stored in the storage device 203. Such an image is hereinafter referred to as the box image.

The transmission operation is a function of the MFP 101 which is executed as a web service. To be more specific, if the user selects the radio button "scanned image" or the radio button "box image", and further, if the user selects a set button corresponding to the selected radio button, content of an advanced setting screen (not illustrated) is sent from the web application 310 to the web browser 320. The user can make setting regarding scanning such as resolution from the advanced setting screen. Further, if the advanced setting screen of the box image is displayed, the user can select image data stored in the storage device 203.

From the region 402, the user selects the destination of the scanned image or the box image. In FIG. 4, the region 402 includes check boxes "FTP server" and "SMB server". If the user selects the check box "FTP server", the MFP 101 transmits the input image (the scanned image or the box image) to the FTP server by using FTP.

If the user selects the check box "SMB server", the MFP 101 transmits the input image (the scanned image or the box image) to the SMB server by using the SMB protocol. This transmission is performed as a web service of the MFP 101. According to the present embodiment, the user can select both the "FTP server" and the "SMB server" at a time. A set button is provided for each of the "FTP server" and the "SMB server" check boxes. If the web browser 320 determines that the set button has been selected, the web browser 320 acquires an advanced setting screen (not illustrated) corresponding to the selected set button from the web application 310. The advanced setting screen of the SMB server accepts setting of the path of the SMB server. The advanced setting screen of the FTP server accepts setting of the path of the FTP server.

The region 403 is where the user makes the print setting. In FIG. 4, the region 403 includes a check box which allows the user to determine whether the user desires to print the image. Further, the region 403 includes a set button. If the user selects the set button, the web browser 320 acquires an advanced setting screen (not illustrated) from the web application 310. The user can set, for example, two-sided printing from the advanced setting screen.

The enter button 404 is selected if the user determines the execution of the job. If the enter button 404 is selected, a communication request including the setting set by the user via the operation screen in FIG. 4 is transmitted to the external apparatus 102.

FIG. 5 is a flowchart illustrating processing performed by the external apparatus 102 according to the present embodiment. The program used for the execution of each step of the flowchart illustrated in FIG. 5 is stored in the storage unit 213 of the external apparatus 102. The program is loaded onto the RAM 212 and executed by the CPU 211.

In the description below, information which the web browser 320 transmits to the web application 310 is referred to as "HTTP request" and information transmitted to the web browser by the web application 310 is referred to as "HTTP response". The web application 310 can include in the HTTP response a command that requires the MFP 101 to perform the FTP transfer processing, the SMB transfer processing, and print processing. The HTTP request is an example of a communication request, and the HTTP response is an example of a communication response.

The flowchart in FIG. 5 is started when the user selects the enter button 404 on the operation screen in FIG. 4 and a HTTP request (communication request) is transmitted from the web browser 320 to the web application 310.

In step S501, the web application 310 receives a HTTP request sent from the web browser 320. The received HTTP request includes the setting which has been set by the user via the operation screen displayed on the display device 205 and accepted by the web browser 320. According to the present embodiment, the HTTP request received in step S501 includes the values set in the regions 401 to 403 on the operation screen in FIG. 4.

In step S502, the web application 310 determines whether a plurality of commands (multipart command) that require the web service based on the setting included in the HTTP request received in step S501 is generated. This determination is based on the information set in the regions 401 to 403 on the operation screen illustrated in FIG. 4.

Whether a plurality of commands is necessary is determined according to whether two settings or more are set in the regions 402 and 403. In other words, the web application 310 determines whether two or more out of the "FTP server" and the "SMB server" in the region 402 and "print" in the region 403 are selected by the user. For example, according to the example illustrated in FIG. 4, since both the FTP server and the SMB server are selected, the web application 310 determines that a plurality of commands needs to be generated. If the web application 310 determines that a plurality of commands is necessary (YES in step S502), the processing proceeds to step S503. If the web application 310 determines that a single command is necessary (NO in step S502), the processing proceeds to step S508.

In step S503, the web application 310 determines a transmitting method when the result of the job executed by the MFP 101 is to be transmitted from the MFP 101 to the external apparatus 102.

To be more precise, if it is determined that commands requesting for a plurality of web services are to be generated, in step S502, a plurality of jobs will be executed by the MFP 101 based on the plurality of commands. Since the time necessary in executing each of the plurality of jobs is different depending on the job type or the job setting, the timing the result of the executed job can be transferred (uploaded) from the MFP 101 to the external apparatus 102 will be also different. Especially, the time for executing a print job is generally long compared to the time necessary in transmitting an image file (transmission job).

If results of jobs that require different execution time are to be transmitted synchronously, the result of the job that does not take time, such as the transmission job, needs to be transmitted together with the result of the job that takes time, such as the print job. Thus the execution result of the transmission job cannot be immediately transmitted after the completion of the job. Thus, even if the transmission job is finished, it cannot be transmitted until the print job is completed. Since the result is not transferred from the MFP 101, the external apparatus 102 cannot proceed to the next processing.

Thus, according to the present embodiment, if a print job is included in a plurality of jobs which is to be executed by the MFP 101, the execution result of the print job will be separately (asynchronously) transmitted. On the other hand, if transmission jobs are included in a plurality of jobs, the execution results of the transmission jobs will be transmitted at one time (synchronously).

For example, regarding the operation screen in FIG. 4, since both the "SMB server" and the "FTP server" are selected, the web application 310 determines that the results of the SMB transfer processing and the FTP transfer processing are to be transmitted synchronously. If the user additionally selects print processing, the web application 310 determines that the print processing is to be transmitted asynchronously.

According to the present embodiment, the print processing is classified as processing of asynchronous transmission and the transmission processing is classified as processing of synchronous transmission. However, the classification is not limited to the above-described example. For example, the print processing can be determined as the asynchronous transmission only when a large number of pages are printed. In other words, the classification can be determined based on whether the web application 310 can easily process the result. If the web application 310 determines that synchronous transmission is to be performed (YES in step S503), the processing proceeds to step S504. If the web application 310 determines that asynchronous transmission is to be performed (NO in step S503), the processing proceeds to step S507.

In step S504, the web application 310 generates a header block necessary in transmitting the HTTP response in multipart form to the MFP 101.

FIG. 6A illustrates an example of a header block of a HTTP response generated by the web application 310 in step S504. The HTTP response in FIG. 6A includes a header block which is generated when the transmission to the FTP server and the SMB server are selected by the user via the operation screen as illustrated in FIG. 4.

A content type 601 is an identifier that indicates whether the HTTP response is written in multipart form. If the content type 601 is "multipart/mixed:boundary=mfp_boundary", then the HTTP response is written in multipart form.

A first boundary 602 is an identifier used to indicate that the strings on and after the first boundary 602 is a first part.

A content type 603 in the first part is an identifier used to indicate whether the body block in the first part includes a processing command that requests for the processing by the service providers 340 to 360. If the content type 603 in the first part is "application/vnd.abc.webservice", the first part is a processing command that requests the service providers 340 to 360 to perform the processing.

A transfer address 604 in the first part is the address to which the processing command included in the body block in the first part is transferred. According to the example in FIG. 6A, the transfer address 604 in the first part is "http://xxx.0.0.1:80/Scantoftp". According to the present embodiment, since http://xxx.0.0.1:80/Scantoftp is a path assigned to the FTP transfer service provider 340, the transfer address 604 in the first part indicates the FTP transfer service provider 340.

A multipart ID 605 in the first part is an identifier used to identify whether each piece of HTTP response written in a multipart form, after it is divided into a respective part, was the HTTP response before the division. A multipart ID 612 in the second part has the same value.

A processing result notification method 606 in the first part indicates whether the processing result is to be transmitted in a synchronous/asynchronous manner regarding a processing result of a processing command of a different part. If the processing result notification method 606 in the first part is "synchronous (sync)", a plurality of processing results to be notified will be transmitted synchronously from the MFP 101 to the external apparatus 102. If the processing result notification method 606 in the first part is "asynchronous (async)", the processing result is separately transmitted from the MFP 101 at timing the processing result of the job has been obtained.

A transfer content type 607 in the first part describes the content in a "ContentType" field of the HTTP header when the transfer application 330 transfers a body block of the HTTP response to a service provider.

An upload address 608 in the first part is an address to which the result of the job executed by the MFP 101 according to a request for the web service is transmitted (uploaded).

A processing command 650 included in the body block in the first part describes a processing command for the FTP transfer service provider. The processing command in the body block in the first part is transferred to the FTP transfer service provider 340. The processing command 650 in the body block of the HTTP response in the first part will be described below with reference to FIG. 6B.

A second boundary 609 is an identifier used to indicate that strings on and after the first boundary 609 is a second part.

Since a content type 610 in the second part, a transfer address 611 in the second part, a multipart ID 612 in the second part, a processing result notification method 613 in the second part, a transfer content type 614 in the second part, an upload address 615 in the second part are basically similar to the components 603, 604, 605, 606, 607, and 608 in the first part, the descriptions are not repeated.

Referring back again to FIG. 5, in step S505, the web application 310 generates the body block written in each part of the HTTP response based on the HTTP request received in step S501. An example of a body block of the HTTP response is illustrated in FIG. 8.

FIG. 6B illustrates an example of the processing command 650 included in the body block in the first part. The processing command 650 includes commands 651 and 652. The command 651 requests for acquisition of box image data. The command 652 requests for FTP transfer of image data. The processing command 650 is written in the form of Extensible Markup Language (XML).

The command 651 requests for acquisition of the box image data stored in the storage device 203 of the MFP 101. The command 651 includes an ID (101011) used for the identification of the box image data.

The command 652 requires the MFP 101 to transmit the box image data. Settings concerning control of the FTP transfer can be included in the command 652. For example, when designating an IP address of the destination by the "FtpAddress" tag and performing transmission by the "FileFormat" tag, whether to transmit the image after converting the image format into, for example, Portable Document Format (PDF) can be designated.

In step S506, the web application 310 joins a plurality of parts that include the header block and the body block and forms one HTTP response in multipart form. Then, the web application 310 transmits the HTTP response to the web browser 320, and the processing ends.

Processing in Step S507 is performed when it is determined in step S503 that the results of the jobs are to be transmitted in an asynchronous manner. In step S507, the web application 310 generates a header block of the HTTP response of each part necessary in transmitting the HTTP response in multipart form. At that time, information (async), which indicates that the processing result of the job is to be individually transmitted, is added to the header block of each part. Other processing is the same as the processing in step S504.

Further, although not illustrated in FIG. 5, if it is determined in step S502 that a plurality of commands (multipart) is to be generated, the processing in steps S503, S504 (or S507), and S505 is repeated for the number of parts which are determined to be in multipart form.

Processing in step S508 is performed when it is determined that the multipart form will not be used in generating the HTTP response in step S502. In step S508, the web application 310 generates a header block of the HTTP response based on the HTTP request received in step S501.

In step S509, the web application 310 generates the body block of the HTTP response based on the HTTP request received in step S501.

In step S510, the web application 310 joins the header block of the HTTP response and the body block of the HTTP response generated in steps S508 and S509, and transmits the obtained HTTP response to the web browser 320.

Figure 7:
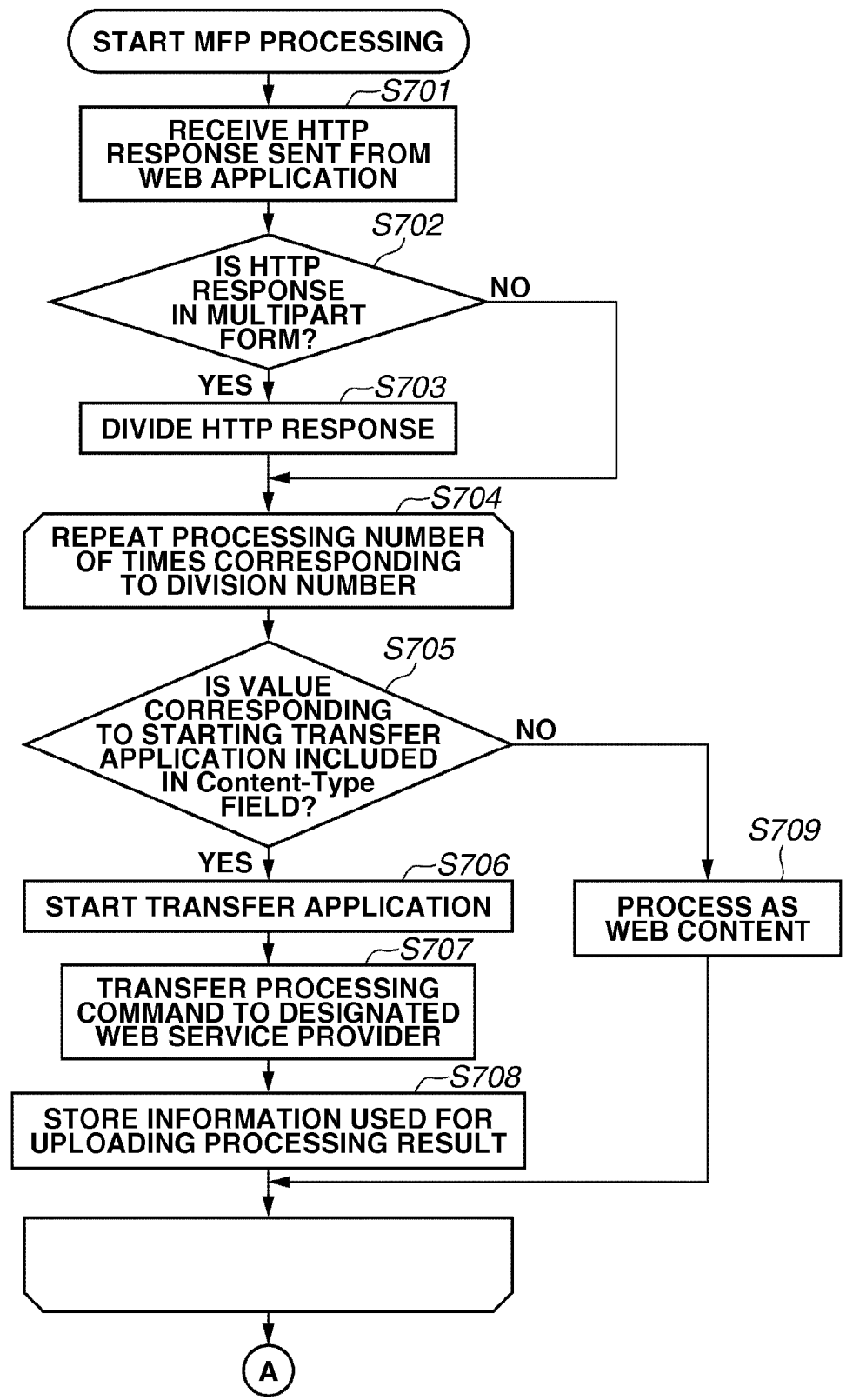
FIG. 7 is a flowchart illustrating processing executed by the MFP illustrated in FIG. 1.

FIG. 7 is a flowchart illustrating processing of the MFP 101 according to the present embodiment. The program used for the execution of each step of the flowchart in FIG. 7 is stored in the storage device 203 of the MFP 101. The program is loaded onto the RAM 202 and executed by the CPU 201.

The flowchart in FIG. 7 is started when the web application 310 transmits the HTTP response to the web browser 320 in step S506 or S510 in FIG. 5.

In step S701, the web browser 320 receives the HTTP response transmitted from the web application 310 of the external apparatus 102. The received HTTP response is a message including a header block and a body block as illustrated in FIG. 6.

In step S702, the web browser 320 determines whether the HTTP response received in step S701 is written in multipart form. To be more precise, the web browser 320 determines whether the content type 601 in the header block of the HTTP response received in step S701 is "multipart". If the web browser 320 determines that the HTTP response is written in multipart form (YES in step S702), the processing proceeds to step S703. If the web browser 320 determines that the HTTP response is not written in multipart form (NO in step S702), the processing proceeds to step S704.

In step S703, the analysis unit 321 of the web browser 320 divides the HTTP response in multipart form. The message of the HTTP response received in step S701 is separated by the "mfp_boundary" in the first boundary 602 and the second boundary 609. The analysis unit 321 identifies the "mfp_boundary" and separates the HTTP response by the identifier into a plurality of parts. The obtained parts are considered as individual HTTP responses.

In step S704, whether the repetition number of steps S705 to S709 has reached a predetermined number of times (the number of pieces the HTTP response has been divided), is determined. According to the example in FIG. 6A, since the parts that constitute a HTTP response 600 is two, whether the processing has been repeated twice is determined. If the HTTP response received in step S701 is not in multipart form, the processing in steps S705 to S709 is performed once.

In step S705, the analysis unit 321 of the web browser 320 analyzes the header block of the HTTP response divided in step S703 or, if the HTTP response is not written in multipart form, the header block of the HTTP response received in step S701. Then, the analysis unit 321 determines whether the "Content-Type" field of the header block of the HTTP response includes "application/vnd.xxx.webservice". This value is an identifier used to determine whether the body block of the HTTP response is to be transferred to the transfer application or whether the web browser 320 processes the content as normal web content. If the header block includes "application/vnd.xxx.webservice" (YES in step S705), the processing proceeds to step S706. If not (NO in step S705), the processing proceeds to step S709.

In step S706, the transfer application starting unit 324 of the web browser 320 starts the transfer application 330. When the transfer application 330 is started, the transfer application starting unit 324 passes the HTTP response, which includes the value of "application/vnd.xxx.webservice" in the header block, to the transfer application 330.

In step S707, the transfer application 330 transmits the processing command in the body block of the HTTP response divided in step S703 to the transfer address 604 or 611 written in the header block of the HTTP response received in step S706, to the service provider.

According to the example illustrated in FIG. 6A, the transfer address 604 in the first part includes the address of the FTP transfer service provider 340. Thus, the processing command of the first part will be transmitted to the FTP transfer service provider 340. Further, the transfer address 611 in the second part includes the address of the SMB transfer service provider 350. Thus, the processing command of the second part will be transmitted to the SMB transfer service provider 350.

The processing command of the first part sent from the transfer application 330 is received by the FTP transfer accepting unit 341 of the FTP transfer service provider 340. Then, the FTP transfer job generation unit 342 generates a FTP transfer job according to the processing command. When the FTP transfer job is generated, the MFP 101 reads the image by the reading device 206 and transmits the obtained image data via the network device 204 as the web service.

The processing command of the second part sent from the transfer application 330 is received by the SMB transfer accepting unit 351 of the SMB transfer service provider 350. Then, the SMB transfer job generation unit 352 generates a SMB transfer job according to the processing command. When the SMB transfer job is generated, the MFP 101 reads the image by the reading device 206 and transmits the obtained image data via the network device 204 using SMB protocol as the web service.

In step S708, the result management unit 332 of the transfer application 330 stores the information in the header block of the HTTP response, in the storage device 203. To be more precise, the result management unit 332 manages the information in the header block of the HTTP response using a management table as the one illustrated in FIG. 8.

FIG. 8 illustrates an example of the management table used in the management of the information stored by the transfer application 330 in step S708.

A multipart ID (MultiID) 801 is the multipart ID included in the HTTP response transferred from the web browser 320 in step S706. The values designated in the multipart ID 605 and the multipart ID 612 are set in this item.

A service provider transfer address (ServiceAddress) 802 gives the information (X-WebserviceAddress) of the service provider to which the processing command has been transferred. The values designated in the transfer addresses 604 and 611 are set in this item.

To an upload address (UploadAddress) 803, the values designated in the upload addresses 608 and 615 are set. An execution result of a job is transmitted to the address set in this item.

To a synchronous/asynchronous (sync/async) 804, the values designated in the processing result notification methods 606 and 613 are set. Thus, an attribute defining the transmission method of the execution result is set in this item.

For example, regarding the HTTP response 600 in the first part in FIG. 6, the values of "111222" designated in the multipart ID 605 in the first part, "http://127.0.0.1:80/Scantoftp" designated in the transfer address 604, "http://aaa.co.jp/bbb/ccc" designated in the upload address 608, and "sync" designated in the processing result notification method 606 in the first part are stored in association with one another.

A state 805 indicates a state of the job identified by the corresponding record. When the value of the state 805 is "uploaded", it shows that the execution result of a job of the corresponding record is already transmitted to an external apparatus (upload completed). If the value of the state 805 is "waiting for transfer of processing result from service provider", the result management unit 332 is waiting for the transmission of an execution result of the job of the corresponding record from the service provider.

Further, if the value of this the state 805 is "waiting for transfer of processing result from other service provider", the execution result of the job of the corresponding record is already received but the result management unit 332 is waiting for an execution result of the job executed by a different service provider so that the execution results of a plurality of jobs can be transmitted synchronously. In this case, the result management unit 332 is waiting for an execution result of a job of a record having a same multipart ID and whose value of the synchronous/asynchronous (sync/async) 804 is "synchronous (sync)".

Processing in step S709 is executed when it is determined that a predetermined value is not included in the "Content-Type" field in step S705. In step S709, the analysis unit 321 of the web browser 320 analyzes the HTML data written in the body block of the HTTP response and displays an operation screen on the display device 205 based on the obtained result.

Figure 9:
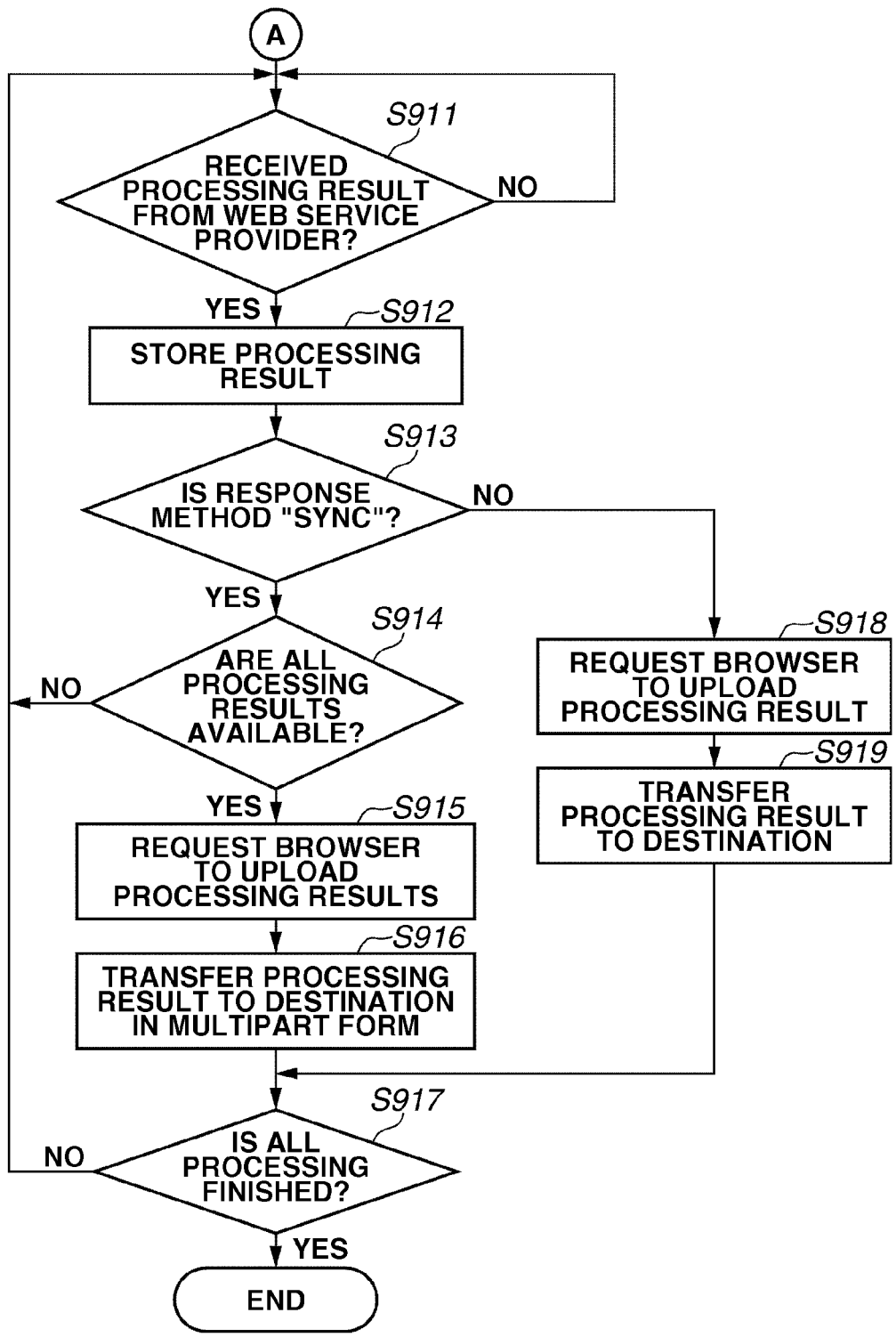
FIG. 9 is a flowchart illustrating processing executed by the MFP illustrated in FIG. 1.

FIG. 9 is a flowchart illustrating processing performed after the processing in the flowchart in FIG. 7.

In step S911, the transfer application 330 starts monitoring to detect whether a response (job execution result) has been transferred from the FTP transfer service provider 340, the SMB transfer service provider 350, or the print service provider 360. The results monitored by the transfer application 330 are, for example, job completion and execution error. If a response is transferred (YES in step S911), the processing proceeds to step S912. If a response is not transferred (NO in step S911), the transfer application 330 continues the monitoring.

In step S912, the result management unit 332 of the transfer application 330 stores the result included in the response transferred from the service providers 340 to 360.

In step S913, the transfer unit 331 confirms the processing result notification method of the processing result transferred from the service providers 340 to 360. A notification method (X-Web service-Multi-Response) of the processing result stored in step S708 is used for the confirmation. If the first part of the HTTP response 600 is to be confirmed, the value of the processing result notification method 606 in the first part will be used. If the notification method of the processing result is synchronous (sync) (YES in step S913), the processing proceeds to step S914. If the notification method of the processing result is asynchronous (async) (NO in step S913), the processing proceeds to step S918.

According to the present embodiment, whether the processing result is transmitted synchronously or asynchronously is determined based on the value of synchronous/asynchronous (sync/async) 804 stored in step S708. However, as an alternate example, whether the processing result should be transmitted synchronously or transmitted asynchronously can be determined by referring to the value of the upload address (UploadAddress) 803 stored in step S708. In this case, if the IDs in the multipart ID (MultiId) 801 have a same value and the addresses in the upload address (UploadAddress) 803 have a same value, the job execution result will be transmitted to the same address in a synchronous manner. On the other hand, if the IDs in the multipart ID (MultiId) 801 have a same value but the addresses in the upload address (UploadAddress) 803 are different, the job execution result will be transmitted in an asynchronous manner.

Further as an alternate example, the order the processing result is transmitted (uploaded) to the external apparatus 102 can be designated. For example, the processing result notification method 606 of the HTTP response in the first part may not be set to "sync" but set to "1" and the processing result notification method 613 in the second part may not be set to "sync" but set to "2". In this case, even if the processing of the SMB transfer service provider, which is the processing in the second part, is completed before the completion of the processing in the first part, the transfer application 330 does not send a request for the result of the processing to the web browser 320 until the processing in the first part is completed.

Furthermore as an alternate example, even if "sync" is designated as the processing result notification method, if the obtained execution result received in step S911 indicates an error, the result can be immediately transmitted to the external apparatus 102 before the execution results of other jobs are obtained.

In step S914, the transfer unit 331 of the transfer application 330 refers to the result management unit 332 and confirms whether all the execution results of the jobs whose values of the multipart ID (Multild) 801 are the same and whose value of synchronous/asynchronous (sync/async) 804 is "sync" are obtained. If all the execution results are obtained (YES in step S914), the processing proceeds to step S915. If all the execution results are not obtained yet (NO in step S914), the processing returns to step S911.

In step S915, the transfer application 330 requires an upload unit 323 of the web browser 320 to transmit (upload) the processing result of the service providers 340 to 360 in multipart form to the web application 310. At that time, the transfer application 330 also transfers to the upload unit 323 all the processing results of the jobs whose values of the multipart ID (Multild) 801 stored in the result management unit 332 are the same and whose values of the synchronous/asynchronous (sync/async) 804 are "sync". When the transfer application 330 makes the request to the upload unit 323, the transfer application 330 designates the upload address.

According to the present embodiment, the upload addresses 608 and 615 of the header block of each part of the HTTP response have a same address. However, the addresses can be designated to be different. Further, if it is determined that a different address is designated, the result can be transmitted individually.

Further, according to the present embodiment, the upload address (X-Web service-UploadAddress) is designated in the header block of each part of the response. However, as an alternate example, a value determined by the MFP 101 in advance can be set as the upload address. In that case, the value is not designated by the external apparatus 102 (the web application 310).

Further, the web browser 320 itself can store and use an address to which the job processing result is uploaded as needed. In this case, the transfer application 330 does not need to designate the upload address to the upload unit 323.

In step S916, the web browser 320 uploads the processing result in multipart form to the designated upload address. To be more precise, the analysis unit 321 joins a plurality of processing results transferred from the transfer application 330 and generates one HTTP request in multipart form. The upload unit 323 uploads the generated HTTP request to the designated upload address.

In step S917, the transfer application 330 determines whether all the processing requested to the service providers 340 to 360 has been completed. The transfer application 330 makes the determination according to whether data remains in the result management unit 332. If no data remains, the transfer application 330 determines that all the processing has been completed, and then the processing ends. If data remains, the processing returns to step S911.

In step S918, the transfer application 330 requires the upload unit 323 of the web browser 320 to upload the processing result to the web application 310.

In step S919, the upload unit 323 uploads the processing result to the address designated by the transfer application 330, and then the processing proceeds to step S917.

Figure 10:
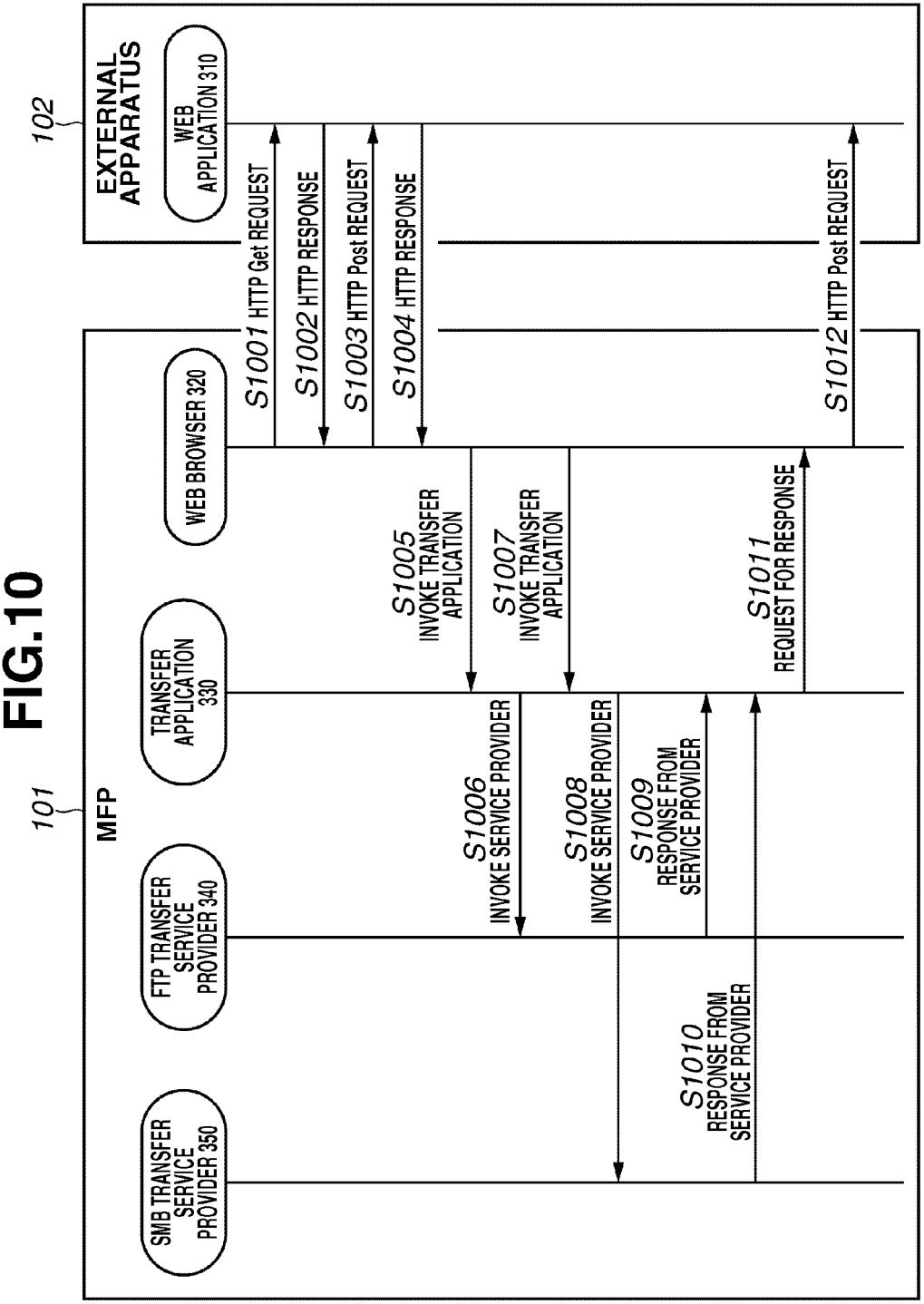
FIG. 10 is a sequence diagram illustrating processing procedures performed by the information processing system illustrated in FIG. 1 when execution results of a plurality of jobs are transmitted at one time.
Figure 11:
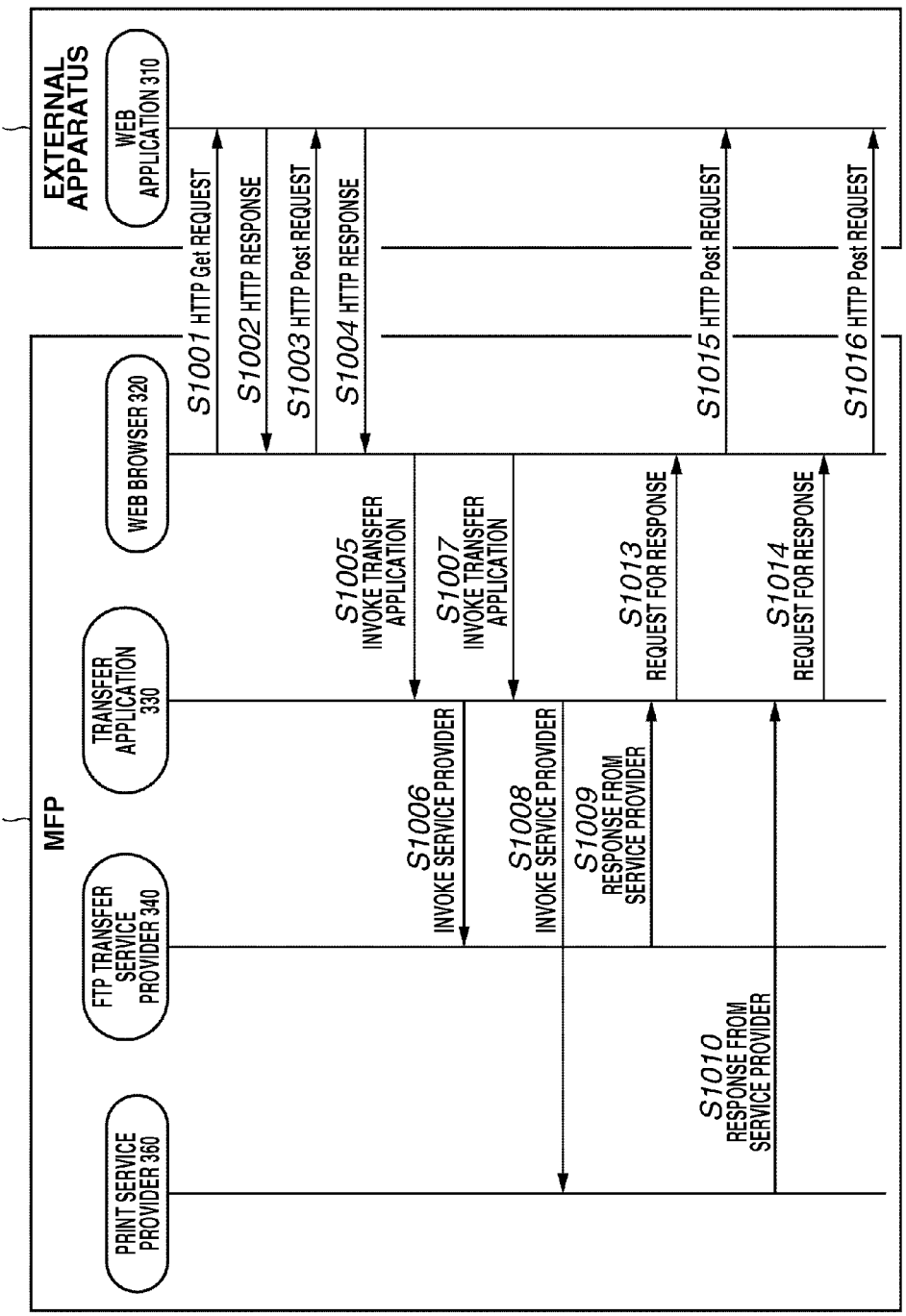
FIG. 11 is a sequence diagram illustrating processing procedures performed by the information processing system illustrated in FIG. 1 when execution results of a plurality of jobs are separately transmitted.

FIG. 10 is a sequence diagram illustrating the processing procedures in the information processing system including the MFP 101 and the external apparatus 102. The sequence diagram in FIG. 10 illustrates processing procedure of the external apparatus 102 which makes a request for processing to a plurality of service providers and the MFP 101 which returns the result of the requested processing to the external apparatus 102. FIG. 10 illustrates a case where a plurality of processing results is transmitted to the external apparatus 102 in a synchronous manner. FIG. 11 illustrates a case where a plurality of processing results is transmitted to the external apparatus 102 in an asynchronous manner.

First, when the user selects a starting button (not illustrated) of the Web browser 320 via the user input device 205, the MFP 101 starts the web browser 320. The starting button can be a hardware button on the user input device 205 or a button displayed on the touch panel of the display device 205.

In step S1001, the web browser 320 transmits a communication request (HTTP get request) to the web application 310 of the external apparatus 102. The communication request includes a uniform resource locator (URL) which identifies the content of the screen illustrated in FIG. 4. According to the present embodiment, the URL is set in advance in the web browser 320. A GET command is used for the transmission of the HTTP request.

In step S1002, the web application 310 generates HTML data of the operation screen to be displayed on the display device 205 according to the communication request received in step S1001. Then, a communication response (HTTP response) including the generated HTML data is transmitted to the web browser 320. The web browser 320 analyzes the HTML data included in the received communication response and displays the screen in FIG. 4 on the display device 205.

In step S1003, when the user selects the enter button 404 on the screen in FIG. 4, the web browser 320 transmits a communication request including parameters (e.g., values input in the regions 401 to 403) set via the screen in FIG. 4 to the web application 310. A POST command is used for the transmission of the HTTP request.

In step S1004, the web application 310 that received the communication response generates a processing command to request for a web service so as to use the functions of the MFP 101 as the web service. The request for the web service remotely calls the service providers 340 to 360 by a technique referred to as remote procedure call. The web application 310 transfers the generated communication response including the processing command to the web browser 320. If a plurality of web services is requested, as described above, a communication response in multipart form will be transferred.

In steps S1005 and S1007, the web browser 320 calls the transfer application 330 based on the communication response transferred from the web application 310. In FIG. 10, step S1005 is the processing performed to make a request for the web service to the FTP transfer service provider 340 and step S1007 is the processing performed to make a request for the web service to the SMB transfer service provider 350.

In step S1006, the transfer application 330 transfers the processing command to the address (any one of the service providers 340 to 360) included in the communication response. In FIG. 10, the communication response includes the addresses of the FTP transfer service provider 340 and the SMB transfer service provider 350. Further, the transfer application 330 extracts a processing command used for requiring the FTP transfer service provider 340 to perform processing included in the communication response received in step S1004, and transfers the extracted processing command to the FTP transfer service provider 340. The FTP transfer service provider 340 accepts the transferred processing command and generates a FTP transfer job according to the processing command.

In step S1008, the transfer application 330 transfers the processing command requesting processing by the SMB transfer service provider to the SMB transfer service provider 350. The processing command is received when the SMB transfer service provider 350 is called in step S1007.

In step S1009, the FTP transfer service provider 340 transfers the result of the job which has been executed to the transfer application 330. Similarly, in step S1010, the SMB transfer service provider 350 transfers the result of the SMB transfer job which has been executed to the transfer application 330.

In step S1011, when the transfer application 330 receives the two execution results transferred in steps S1009 and S1010, the transfer application 330 sends a request to the web browser 320 for synchronous transfer (uploading) of the two execution results to the web application 310. In step S1012, the web browser 320 transfers a communication request (HTTP request) including the results acquired in steps S1009 and S1010.

In step S1012, the MFP 101 transfers (uploads) the results of the processing performed by the FTP transfer service provider 340 and the SMB transfer service provider 350 to the external apparatus 102 in a synchronous manner. Thus, the number of communication times can be reduced.

FIG. 11 is a sequence diagram illustrating the processing procedures of the MFP 101 calling the FTP transfer service provider 340 and the print service provider 360. Differently from the sequence diagram in FIG. 10, the execution results of the processing performed by the service providers are individually transferred (uploaded) to the external apparatus 102. Since the processing in steps S1001 to S1010 is substantially similar to the processing described with reference to FIG. 10, descriptions of such processing is not repeated.

In step S1013, after the transfer application 330 receives the execution result of the FTP transfer job in step S1009, the transfer application 330 requires the web browser 320 to upload the execution result to the external apparatus 102. At that time, the transfer application 330 sends out the request to the web browser 320 without waiting for an execution result even if the execution result of a job performed by a different service provider is not received. In response to the request in step S1013, the web browser 320 transmits a communication request (HTTP request) including the execution result to the web application 310 of the external apparatus 102 by POST command.

In step S1014, after the transfer application 330 receives the execution result of the print job in step S1010, the transfer application 330 requires the web browser 320 to upload the execution result to the external apparatus 102. In response to the request in step S1014, the web browser 320 transmits a communication request including the execution result to the web application 310 by POST command.

In steps S1013 and S1014, since the MFP 101 transmits the execution result to the web application 310 immediately after receiving the execution result of the job, the external apparatus 102 can promptly proceed to the next processing.

According to the present embodiment, the MFP 101 parallelly executes a plurality of jobs when it receives a processing command which is a web service request generated by the external apparatus 102. At this time, it is determined whether the execution result is transferred to the external apparatus 102 in a synchronous manner or in an asynchronous manner. According to the determination result, the transmission method is changed, so that an appropriate transmission method can be selected considering job content, job type, and job execution time.

Further, whether to transfer the execution results in a synchronous/asynchronous manner can be determined based on the information (Sync or Async) added to the processing command transmitted by the external apparatus 102. As a result, the transfer (upload) method of the result of the processing performed by the MFP 101 can be designated by the external apparatus 102.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-283777 filed Dec. 20, 2010, which is hereby incorporated by reference herein in its entirety.

What is claimed is:

1. A system for transmitting job results, the system comprising:
   an external apparatus; and
   an image processing apparatus,
   wherein the image processing comprises:
   an accepting unit configured to accept a user setting;
   a communication unit configured to transmit to the external apparatus a request including the user setting and to receive from the external apparatus a response including a processing command in response to the transmitted request;
   a processing unit configured to:
   execute, when the communication unit receives the response, a plurality of jobs based on the processing command included in the received response;
   determine whether to transmit an execution result of the plurality of jobs to be executed in a first manner in which the execution result is to be transmitted in response to a completion of an execution of all the plurality of jobs or in a second manner in which the execution result is to be transmitted for each of the plurality of jobs; and
   transmit, in response to the completion of the execution of the plurality of jobs, one request including an execution result of the plurality of jobs if it is determined that the execution result is to be transmitted in the first manner, and transmit, in response to a completion of an execution of a first job of the plurality of jobs, a request including an execution result of the first job to the external apparatus, and transmit, in response to a completion of an execution of a second job of the plurality of jobs, a request including an execution result of the second job to the external apparatus if it is determined that the execution result is to be transmitted in the second manner, wherein the external apparatus comprises:
a communication unit configured to receive, from the image processing apparatus, the request including the user setting, and to transmit the response including the processing command to the image processing apparatus, wherein the transmitted processing command is generated based on the user setting included in the received request.

2. The system according to claim 1, wherein the processing unit determines whether to transmit the execution result in the first manner or in the second manner based on information indicating synchronous or asynchronous included in the response received by the communication unit.

3. The system according to claim 1, wherein the image processing apparatus further comprises an input unit configured to input image data,
wherein the job executed by the execution unit is either a transmission job where the image data input by the input unit is transmitted to another apparatus, or a print job where the image data input by the input unit is printed.

4. The system according to claim 3, wherein the processing unit determines that, if one of the plurality of jobs executed by the execution unit is the print job, the execution results are to be transmitted in the second manner.

5. The system according to claim 1, wherein if the processing unit determines that the plurality of execution results are to be transmitted in the second manner, the plurality of requests including the execution results of the jobs transmitted by the communication unit are transmitted in an order the execution of the jobs is completed.

6. The system according to claim 1, wherein the response received by the communication unit is written in multipart form.

7. The system according to claim 6, wherein a plurality of jobs are generated according to the response written in the multipart form.

8. The system according to claim 1, wherein the request and the response are messages according to Hypertext Transfer Protocol (HTTP).

9. The system according to claim 8, wherein the processing command included in the response is a message according to Simple Object Access Protocol (SOAP).

10. An image processing apparatus comprising:
an accepting unit configured to accept a user setting via an operation unit;
a communication unit configured to transmit to an external apparatus a request including the user setting and to receive from the external apparatus a response including a processing command in response to the transmitted request; and
a processing unit configured to:
execute, when the communication unit receives the response, a plurality of jobs based on the processing command included in the received response;
determine whether to transmit an execution result of the plurality of jobs to be executed in a first manner in which the execution result is to be transmitted in response to a completion of an execution of all the plurality of jobs or in a second manner in which the execution result is to be transmitted for each of the plurality of jobs;
transmit, in response to the completion of the execution of the plurality of jobs, one request including an execution result of the plurality of jobs if it is determined that the execution result is to be transmitted in the first manner, and transmit, in response to a completion of execution of a first job of the plurality of jobs, a request including an execution results of the first job to the external apparatus
transmit, in response to a completion of an execution of a second job of the plurality of jobs, a request including an execution result of the second job to the external apparatus if it is determined that the execution result is to be transmitted in the second manner.

11. The image processing apparatus according to claim 10, wherein the processing unit determines whether to transmit the execution result in the first manner or in the second manner based on information indicating synchronous or asynchronous included in the response received by the communication unit.

12. The image processing apparatus according to claim 10, wherein the image processing apparatus further comprises an input unit configured to input image data,
wherein the job executed by the execution unit is either a transmission job where the image data input by the input unit is transmitted to another apparatus, or a print job where the image data input by the input unit is printed.

13. The image processing apparatus according to claim 12, wherein the processing unit determines that, if one of the plurality of jobs executed by the execution unit is the print job, the execution results are to be transmitted in the second manner.

14. The image processing apparatus according to claim 10, wherein if the processing unit determines that the plurality of execution results are to be transmitted in the second manner, the plurality of requests including the execution results of the jobs transmitted by the communication unit are transmitted in an order the execution of the jobs is completed.

15. The image processing apparatus according to claim 10, wherein the response received by the communication unit is written in multipart form.

16. The image processing apparatus according to claim 15, wherein a plurality of jobs are generated according to the response written in the multipart form.

17. The image processing apparatus according to claim 10, wherein the request and the response are messages according to Hypertext Transfer Protocol (HTTP).

18. The image processing apparatus according to claim 17, wherein the processing command included in the response is a message according to Simple Object Access Protocol (SOAP).

19. A method of an image processing apparatus, the method comprising:
accepting a user setting;
transmitting to an external apparatus a request including the user setting;
receiving from the external apparatus a response including a processing command in response to the transmitted request;
executing, when the response is received, a plurality of jobs based on the processing command;
determining whether to transmit an execution result of the plurality of jobs to be executed in a first manner in which the execution result is to be transmitted in response to a completion of an execution of all the plurality of jobs or in a second manner in which the execution result is to be transmitted for each of the plurality of jobs;

transmitting, in response to the completion of the execution of all the plurality of jobs, one request including an execution result of the plurality of jobs if it is determined that the execution result is to be transmitted in the first manner;

transmitting, in response to a completion of an execution of a first job of the plurality of jobs, a request including an execution result of the first job to the external apparatus; and transmitting, in response to a completion of an execution of a second job of the plurality of jobs, a request including an execution result of the second job to the external apparatus if it is determined that the execution result is to be transmitted in the second manner.

20. A non-transitory computer-readable storage medium storing a computer program to cause an image processing apparatus to perform the steps of:

accepting a user setting;

transmitting to an external apparatus a request including the user setting;

receiving from the external apparatus a response including a processing command in response to the transmitted request;

executing, when the response is received, a plurality of jobs based on the processing command;

determining whether to transmit an execution result of the plurality of jobs to be executed in a first manner in which the execution result is to be transmitted in response to a completion of an execution of all the plurality of jobs or in a second manner in which the execution result is to be transmitted for each of the plurality of jobs;

transmitting, in response to the completion of the execution of all the plurality of jobs, one request including an execution result of the plurality of jobs if it is determined that the execution result is to be transmitted in the first manner;

transmitting, in response to a completion of an execution of a first job of the plurality of jobs, a request including an execution result of the first job to the external apparatus; and transmitting, in response to a completion of an execution of a second job of the plurality of jobs, a request including an execution result of the second job to the external apparatus if it is determined that the execution result is to be transmitted in the second manner.

* * * * *